UNITED STATES PATENT OFFICE.

JULIUS R. POND, OF NEW HARTFORD, CONNECTICUT.

IMPROVED METHOD OF PREPARING VACUUM-VESSELS FOR CONDENSING MILK, &c.

Specification forming part of Letters Patent No. 54,950, dated May 22, 1866.

*To all whom it may concern:*

Be it known that I, JULIUS R. POND, of New Hartford, in the county of Litchfield and State of Connecticut, have invented a new and useful Method of Preparing or Treating the Metal of Vacuum-Vessels used for Condensing Milk and other Articles, whereby I am enabled to prevent any injurious coating of the vacuum-vessel during the process of condensation; and I hereby declare that the following is a full, clear, and exact description thereof.

No drawings accompany this specification, for the reason that the nature of the case does not admit of drawings.

When crude milk—that is, milk in its natural state as it comes from the animal—is attempted to be condensed in a vacuum-vessel, it is found that the albumen contained in the milk, which, like the albumen of other substances, is readily coagulable upon the application to it of caloric, commences to be coagulated as soon as the heat necessarily employed in the concentrating process begins to act upon it. The albumen, as it coagulates, deposits itself upon the inner surface of the vacuum-vessel and upon the outer surface of the steam-coil, and rapidly coats them to such an extent that, as it is an extremely good non-conductor of heat, the condensing process is prevented from being carried on with any practical success.

Mr. Gail Borden patented, in the year 1856, a process for obviating this coating, which consists in heating, away from the vacuum-vessel, the milk which is to be condensed, and in this manner coagulating the greater portion of its albumen before the milk is run into the vacuum-vessel. I have also myself obtained a patent for a process for preventing the coating by means of applying, before the charge of milk to be condensed is run into the vacuum-vessel, a small quantity of oil or grease to those parts of the vessel or coil which are exposed to the deposit of the coagulated albumen. This method of procedure is entirely successful in practice, and my present invention relates to a modification of the mode set forth in my said patent for carrying this process into operation.

In consists in impregnating the metal of which the vacuum-vessel is made with the oily or greasy substance employed for the purpose of preventing the coating, by means of boiling such substance into the pores of the metal or otherwise thoroughly saturating the latter with the substance, either before or after the vessel is constructed.

In order that others may be enabled to fully understand and make use of my invention, I will describe some of the modes which I prefer for boiling the oily or greasy material into the metal, and which I find to answer a good purpose in practice.

If the vacuum-vessel to be treated is provided with an outer steam or water jacket, as is sometimes the case, I prefer to heat the vessel by means of steam run into this jacket for several hours—say six hours, more or less—and when it has become as hot as the steam can make it, so that the metal is expanded and its pores are somewhat opened, I fill it with the oil or other greasy substance to be employed, and then continue the boiling for several hours longer, and until the substance is thoroughly boiled into the pores of the metal and the latter has been completely saturated with it.

When the metal of the vessel has been thus treated, I find not only that all the advantageous results of my above-mentioned patented process are secured, but also that the vessel can be used for quite a long period of time without requiring any fresh application of the oil or grease, either in the manner here described or in the manner described in my said patent.

If the vacuum-vessel is not provided with a steam-jacket, the oil or grease may be boiled into the metal by first heating the latter by an open fire, and then proceeding as above directed, or the oil or grease may be applied in any other convenient manner.

If desired, the same effect may be produced by boiling the metal of which it is proposed to construct a vacuum-vessel in oil or grease for a sufficient length of time to thoroughly saturate the metal with the oily matter. This boiling may be performed either by putting the metal into the oil or into grease, which I prefer should be melted, and then applying heat to it for, say, six hours, more or less, or by first heating the metal until it is expanded and its pores are opened, and then putting it into and boiling it for six hours, more or less, in the oil or melted grease, which also should, by preference, be in a heated condition; or the impregnation with the greasy matter may be effected by any other convenient means, though I have found boiling to be the best method.

But I do not confine myself to effecting it by boiling nor to effecting it by boiling in the particular manner set forth, as any mode of securing the impregnation will embody my invention, so long as it attains the object specified—that is to say, to substantially saturate and fill the pores of the metal with the oily material, for the purpose described.

I have found the above-mentioned periods of boiling to answer a good purpose; but I do not restrict myself to any particular length of time for this part of the operation, as the longer the boiling is continued within convenient limits the better will be the results.

It is proper to mention that it is not all oily materials which will answer the proposed purpose with entire success, but rather those which are greasy as well as oily, such as the fatty oils, among which I may name the oil of butter, and also stearine, cerine, glycerine, and other analogous substances.

Having thus described my invention, what I claim as new, and desire to secure by Letters Patent, is—

Treating metal with an oily or greasy substance, substantially such as set forth, or its equivalent, in the manner and for the purpose substantially as described.

JULIUS R. POND.

Witnesses:
S. D. COZZENS,
J. LIVINGSTON PREVOST.